United States Patent [19]

Senda et al.

[11] Patent Number: 4,891,689
[45] Date of Patent: Jan. 2, 1990

[54] COLOR SIGNAL MATRIX CIRCUITS

[75] Inventors: Tetsuya Senda, Kanagawa; Tokuya Fukuda, Tokyo; Hiroaki Matsumoto, Chiba, all of Japan

[73] Assignee: Sony Corporation, Tokyo, Japan

[21] Appl. No.: 306,381

[22] Filed: Feb. 6, 1989

[30] Foreign Application Priority Data

Feb. 16, 1988 [JP] Japan .................................. 63-033736

[51] Int. Cl.$^4$ ............................................. H04N 9/67
[52] U.S. Cl. ......................................... 358/30; 358/41
[58] Field of Search ................... 358/30, 13, 23, 21 R, 358/41

[56] References Cited

U.S. PATENT DOCUMENTS 4,507,676 3/1985 Dischert et al. ...................... 358/30
4,547,796 10/1985 Iwase et al. ............................ 358/16

FOREIGN PATENT DOCUMENTS 0019292 1/1986 Japan .
0086995 4/1988 Japan .
0087892 4/1988 Japan .
2073535 10/1981 United Kingdom .................. 358/30

Primary Examiner—Tommy P. Chin
Assistant Examiner—James Juo
Attorney, Agent, or Firm—Lewis H. Eslinger; Jay H. Maioli

[57] ABSTRACT

A color signal matrix circuit for producing first and second color difference signals from three primary color signals employs a reduced number of digital circuit elements and includes a first subtractor for producing a first color subtraction signal based on red and green primary color signals, a second subtractor for producing a second color subtraction signal based on blue and green primary color signals, a first level adjuster receiving the first color subtraction signal, a second level adjuster with a variable level factor receiving the second color subtraction signal, a third subtractor receiving the first color subtraction signal from the first level adjuster and the second color subtraction signal from the second level adjuster for producing the first color difference signal, and a third level adjuster receiving the second color subtraction signal, a fourth level adjuster with a variable level factor receiving the first color subtraction signal, and a fourth subtractor supplied with the second color subtraction signal from the third level adjuster and the first color subtraction signal from the fourth level adjuster for producing the second color difference signal.

7 Claims, 2 Drawing Sheets

COLOR SIGNAL MATRIX CIRCUITS

BACKGROUND OF THE INVENTION

1. Field of the Invention

The present invention relates generally to color signal matrix circuits and, more particularly, relates to an improved matrix circuit for producing two color difference signals from three primary color signals for use in a signal processing circuit of a color video camera.

2. Description of the Background

In a signal processing circuit used in a color video camera that produces a color video signal, three primary color signals including red, green, and blue, represented by R, G, and B, respectively, are produced based on a image pickup output signal obtained from the image pickup device of the camera. A luminance signal, represented by Y, and two color difference signals, represented by (R-Y) and (B-Y), respectively, are then produced from the red, green, and blue primary color signals (R, G, and B) in order to form the desired color video signal. To accomplish such signal processing in a color video camera it has been recently proposed to use digital circuits, and one previously proposed digital circuit for use as a color signal matrix circuit for producing color difference signals from three primary color signals (R, G, B) is shown in FIG. 1.

In the circuit of FIG. 1, red, green, and blue primary color signals (R, G, and B) are each produced in digital form based on an image pickup output signal obtained from an image pickup device (not shown in FIG. 1) and supplied to input terminals 11, 12, and 13, respectively. The red primary color signal R at input terminal 11 is adjusted in level by a fixed level factor of 0.70 by a level adjuster 14 and is then supplied to a subtractor 19. The blue primary color signal B at input terminal 13 is also adjusted in level by a fixed level factor of 0.11 by a level adjuster 16 and is also supplied to subtractor 19. In subtractor 19 the blue primary color signal B obtained from level adjuster 16 is subtracted from the red primary color signal R obtained from the level adjuster 14 and a difference signal is produced and fed to a subtractor 21. The green primary color signal G at input terminal 12 is adjusted in level by a fixed level factor of 0.59 by a level adjuster 15 and then supplied to subtractor 21. In subtractor 21, the green primary color signal G obtained from level adjuster 15 is subtracted from the difference output obtained from subtractor 19 to produce an intermediate color difference signal (R-Y)' at the output of subtractor 21.

The red primary color signal R from input terminal 11 is also adjusted in level by a fixed level factor of 0.30 by a level adjuster 17 and then supplied to a subtractor 20. The blue primary color signal B from input terminal 13 is also adjusted in level by a level factor of 0.89 by a level adjuster 18 and then fed to subtractor 20. In subtractor 20, the level-adjusted (0.30) red primary color signal R obtained from level adjuster 17 is subtracted from the level-adjusted (0.89) blue primary color signal B obtained from level adjuster 18 to produce a difference output supplied to a subtractor 22. Further, the level-adjusted (0.59) green primary color signal G obtained from level adjuster 15 is also supplied to subtractor 22. In subtractor 22 the level-adjusted (0.59) green primary color signal G obtained from level adjuster 15 is subtracted from the difference output from subtractor 20 to produce an intermediate color difference signal (B-Y)' at the output of subtractor 22.

Fixed value level adjusters, such as elements 14-18, for digital signals are formed based on bit-shift type adders. Thus, the amount of level adjustment is fixed in each individual digital adder.

The color difference signal (R-Y)' obtained from subtractor 21 is supplied directly to an adder 23 and is also fed through a variable level adjuster 26, by which the color difference signal (R-Y)' is adjusted to have a relatively small level, to an adder 24. The color difference signal (B-Y)' obtained from subtractor 22 is supplied directly to adder 24 and is also fed through a variable level adjuster 25, by which the color difference signal (B-Y)' is adjusted to have a relatively small level, to adder 23. Consequently, the color difference signal (B-Y)' having a relatively small level is added in adder 23 to the color difference signal (R-Y)' derived from subtractor 21 to produce a summed output fed through a variable level adjuster 27 to an output terminal 29 as the desired color difference signal (R-Y). Further, the color difference signal (R-Y)' having the relatively small level is added in adder 24 to the color difference signal (B-Y)' derived from subtractor 22 to produce a summed output fed through a variable level adjuster 28 to an output terminal 30 as a color difference signal (B-Y).

Variable level adjusters, such as elements 25 and 26, for digital signals are formed based on digital multipliers. Thus, the amount of level adjustment is controlled by varying the multiplication factor in the digital multiplier. The purpose of these variable level adjusters is to compensate for nonuniformity or fluctuations in the values of each circuit element, that is, to compensate component value deviations within the permitted tolerance range. Thus, the amount of level adjustment provided by level adjusters 25,26 is quite small, on the order of 0.1 or 0.2, for example, and may be thought of as comprising trim adjustments. These adjustments are typically made at the manufacturing site of the video camera.

Each color difference signal (R-Y) and (B-Y) which is formed at adders 23 and 24, respectively, has been processed to correct imbalances in level among the red, green, and blue primary color signals (R, G, and B), which result from differences in the spectral-response characteristics among the image pickup elements for the red, green, and blue primary colors in the image pickup device of the color video camera and also has been compensated for circuit element tolerances.

FIG. 2 shows another previously proposed color signal matrix circuit for producing color difference signals from three primary color signals (R,B,and G). In FIG. 2, red, green, and blue primary color signals (R, G, and B) are each produced in digital form based on an image pickup signal output from an image pickup device (not shown in FIG. 2) and supplied to input terminals 31, 32, and 33, respectively. The red primary color signal R at input terminal 31 and the green primary color signal G at input terminal 32 are supplied to a subtractor 34, in which the green primary color signal G is subtracted from the red primary color signal R, and a difference output represented by (R-G) is obtained. Further, the blue primary color signal B at input terminal 33 and the green primary color signal G at input terminal 32 are supplied to a subtractor 35, in which the green primary color signal G is subtracted from the blue primary color signal, B and a difference output represented by (B-G) is obtained.

The subtraction output (R-G) of subtractor 34 is adjusted in level to a level factor of 0.70 by a level adjuster 36 and then supplied to a subtractor 40, and the subtraction output (B-G) is also adjusted in level by a level factor of 0.11 in a level adjuster 37 and then supplied to subtractor 40. In subtractor 40 the level-adjusted difference output (B-G) derived from level adjuster 37 is subtracted from the level-adjusted difference output (R-G) from level adjuster 36 to produce an intermediate color difference signal (R-Y)'. Further, the subtraction output (R-G) from subtractor 34 is also adjusted in level by a level factor of 0.30 in a level adjuster 38 and then fed to a subtractor 41, and the subtraction output (B-G) from subtractor 35 is also adjusted in level by a level factor of 0.89 in a level adjuster 39 and then supplied to subtractor 41. In subtractor 41, the level-adjusted difference output (R-G) derived from level adjuster 38 is subtracted from the level-adjusted difference output (B-G) derived from level adjuster 39 to produce an intermediate color difference signal (B-Y)'.

The color difference signal (R-Y)' obtained from subtractor 40 is fed directly to an adder 42 and also through a variable level adjuster 45, by which the color difference signal (R-Y)' is adjusted to a relatively small level, to an adder 43. The color difference signal (B-Y)' obtained from subtractor 41 is fed directly to adder 43 and through a variable level adjuster 44, by which the color difference signal (B-Y)' is adjusted to a relatively small level, to adder 42. Consequently, a color difference signal (B-Y)' having a relatively small level is added to the color difference signal (R-Y)' derived from subtractor 40 to produce an output at adder 42 that is fed through a final variable level adjuster 46 to an output terminal 48 as the desired color difference signal (R-Y). Similarly, the color difference signal (R-Y)' having the relatively small level is added to the color difference signal (B-Y)' derived from subtractor 41 to produce an output at adder 43 that is fed through a final variable level adjuster 47 to an output terminal 49 as the desired color difference signal (B-Y).

In the circuit of FIG. 2, each of the color difference signals (R-Y) and (B-Y) that are formed at adders 42 and 43, respectively, has been processed to correct level imbalances among the red, green, and blue primary color signals (R, G, and B) resulting from differences in spectral-response characteristics among the respective image pickup elements for the red, green and blue primary colors in the image pickup device.

In each of these previously proposed color signal matrix circuits of FIGS. 1 and 2, however, there is an inherent disadvantage that the configuration of the entire circuit becomes complicated and must be constructed on a relatively large scale, because generally a separate adder or subtractor is required for each adding or subtracting operation of two input signals in a digital circuit and, therefore, the number of adder and subtract circuits is inevitably increased in the case where adding and subtracting operations for three input signals are required. In addition, digital bit-shift adders and digital multipliers take up relatively large volumes in these digital circuits and the requirement to use large numbers of these elements increases the overall size of the circuits. There is also the disadvantage that the color matrix circuit is not easily adaptable for incorporation into a large scale integrated circuit (LSI).

OBJECTS AND SUMMARY OF THE INVENTION

Accordingly, it is an object of the present invention to provide a color signal matrix circuit for producing color difference signals from three primary color signals that overcomes the aforementioned disadvantages inherent in the circuits previously proposed.

Another object of the present invention is to provide a digital color signal matrix circuit for producing color difference signals from three primary color digital signals that has a relatively simple configuration and employs fewer circuit components than similar systems known heretofore.

A further object of the present invention is to provide a digital color signal matrix circuit for producing color difference signals from three primary color digital signals that is constructed with a relatively simple configuration and a reduced circuit volume, without any deterioration in performance for the processing of color signals.

A still further object of the present invention is to provide a digital color signal matrix circuit for producing color difference signals from three primary color digital signals that is adapted for being incorporated into a large scale integrated circuit.

It is another object of the present invention to provide a color matrix circuit with reduced circuit volume compared with previously proposed circuits that can provide color phase adjustment and color saturation adjustment to compensate nonuniformity of the color matrix circuit elements.

According to an aspect of the present invention, a color signal matrix circuit that produces two color difference signals from three primary color signals comprises a first subtractor for producing a first subtraction output signal based on blue and green primary color signals, a first level adjuster supplied with the first subtraction output signal, a second level adjuster provided with a variable level factor and supplied with the second subtraction output signal, a third subtractor supplied with the first subtraction output signal adjusted in level by the first level adjuster and the second subtraction output signal adjusted in level by the second level adjuster for producing the first color difference signal, and a third level adjuster supplied with the second subtraction output signal, a fourth level adjuster provided with a variable level factor and supplied with the first subtraction output signal, and a fourth subtractor supplied with the second subtraction output signal adjusted in level by the third level adjuster and the first subtraction output signal adjusted in level by the fourth level adjuster for producing the second color difference signal.

In such embodiment of the present invention, a fifth level adjuster is also provided with a variable level factor for adjusting a level of the first color difference signal and a sixth level adjuster is provided with a variable level factor for adjusting a level of the second color difference signal.

In another embodiment of the present invention, each of the first and third level adjusters is constructed to have a variable level factor.

In the color signal matrix circuit in accordance with the embodiment of the present invention, the first subtraction output signal is derived from the first subtractor in which, for example, the green primary color signal is subtracted from the red primary color signal, and the second subtraction output signal is derived from the second subtractor in which, for example, the green primary color signal is subtracted from the blue primary color signal. The first subtraction output signal is adjusted in level to have a predetermined level factor by the first level adjuster and then supplied to the third subtractor, and the second subtraction output signal is also adjusted in level to have a variable level factor by the second level adjuster and then supplied to the third subtractor. In the third subtractor, for example, the second subtraction output signal derived from the second adjuster is subtracted from the first subtraction output signal derived from the first level adjuster to produce the first color difference signal.

Further, the second subtraction output is adjusted in level to have a predetermined level factor by the third level adjuster and then supplied to the fourth subtractor and the first subtraction output signal is adjusted in level to have a variable level factor by the fourth level adjuster and then supplied to the fifth subtractor. In the fourth subtractor, the first subtraction output derived from the fourth level adjuster is subtracted from the second subtraction output derived from the third level adjuster to produce the second color difference signal.

With such operations as mentioned above, the color signal matrix circuit according to the present invention requires a reduced number of digital subtractors as well as a reduced number of level adjusters, compared with the previously proposed color signal matrix circuit and, therefore, is constructed with a relatively simple configuration on a reduced scale without deteriorating performance and is adapted to be incorporated into a large scale integrated circuit arrangement.

The above and other objects, features, and advantages of the present invention will become apparent from the following detailed description which is to be read in conjunction with the accompanying drawings in which like reference numerals represent the same or similar elements.

DETAILED DESCRIPTION OF PREFERRED EMBODIMENTS

Figure 3:
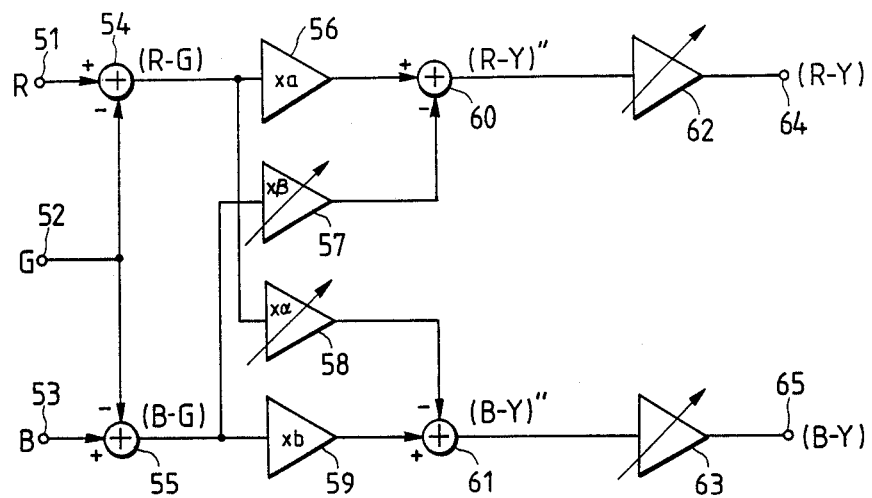
FIG. 3 is a schematic in block diagram form of one embodiment of a color signal matrix circuit according to the present invention.

An embodiment of a color signal matrix circuit according to the present invention which is applied to a digital signal processing circuit arrangement used in a color video camera is shown in FIG. 3, in which three input terminals 51, 52, and 53 are provided with red, green, and blue primary color signals (R, G, and B), each of which is a digital signal, such as an image pickup output signal obtained from an image pickup device employed in the color video camera. The red primary color signal R at input terminal 51 and the green primary color signal G at input terminal 52 are supplied to a subtractor 54 in which the green primary color signal G is subtracted from the red primary color signal R, and a difference output signal (R-G) is obtained. The blue primary color signal B at input terminal 53 and the green primary color signal G at input terminal 52 are supplied to a subtractor 55 in which the green primary color signal G is subtracted from the blue primary color signal B, and a difference output signal (B-G) is produced.

The difference output signal (R-G) produced by subtractor 54 is adjusted in level by a level adjuster 56 provided with a level factor a predetermined in this example to be 0.70, so as to have (R-G) at a level factor of 0.70 supplied to one input terminal of a subtractor 60. The (R-G) signal is also adjusted in level by a variable level adjuster 58 provided with a variable level factor $\alpha$ that has a value in a relatively narrow range that includes 0.30, and the (R-G) signal at the variable level factor $\alpha$ of the value is supplied to one input terminal of a subtractor 61. This narrow range corresponds to the small level of variable adjuster 25, for example, and it will be explained below. The difference output signal (B-G) obtained from subtractor 55 is adjusted in level by a level adjuster 59 provided with a level factor b that is 0.89, so that 0.89 (B-G) is supplied to the other input terminal of subtractor 61. The (B-G) signal is also adjusted in level by a variable level adjuster 57 provided with a variable level factor $\beta$ set at a value in a relatively narrow range that includes 0.11, so that the (B-G) signal at the variable level factor $\beta$ is supplied to the other input terminal of subtractor 60.

The subtraction output signal (B-G) which is adjusted in level by the variable level adjuster 57, is subtracted from the subtraction output signal (R-G), which is adjusted in level by the level adjuster 56, to produce a color difference signal (R-Y)″.

If all circuit elements were perfect then the variable nature of adjusters 57 and 58 would not be necessary and adjuster 58 could be fixed at 0.30, for example. Nevertheless, the values of circuit components are nonuniform so that the value 0.30 might be varied in adjuster 58 to 0.29 or 0.31, for example. Thus, this narrow range may be plus or minus 0.1 or 0.2, depending on the accuracy of the values of the circuit elements.

In such an operation, assuming that the output of subtractor 60 is represented by (R-Y)″, the following equations are satisfied:

$$\begin{aligned}(R - Y)'' &= a(R - G) - \beta(B - G) \\ &= 0.70(R - G) - \beta(B - G) + Y - Y \\ &= 0.70(R - G) - \beta(B - G) + 0.30R + \\ &\quad 0.59G + 0.11B - Y \\ &= (R - Y) + (0.11 - \beta)B + (\beta - 0.11)G\end{aligned} \quad (1)$$

where Y represents a luminance signal of the NTSC color standard.

Because (R-Y)″ should be basically equal to (R-Y) in equation (1) above, the variable level factor is set to be a value in a relatively narrow range that would include 0.11.

Similarly, in subtractor 61 the difference output signal (R-G), which is adjusted in level by the variable level adjuster 58, is subtracted from the difference output signal (B-G), which is adjusted in level by the level adjuster 59, to produce a color difference signal (B-Y)″.

In such an operation, assuming that an output of subtractor 61 is represented by (B-Y)″, the following equations are also satisfied:

$$\begin{aligned}(B-Y)'' &= b(B-G) - a(R-G) \quad (2)\\ &= 0.89(B-G) - a(R-G) + Y - Y\\ &= 0.89(B-G) - a(R-G) + 0.30R +\\ &\quad 0.59G + 0.11B - Y\\ &= (B-Y) + (0.30 - a)R + (a - 0.30)G\end{aligned}$$

Because (B-Y)'' should be basically equal to (B-Y) in equation (2) above, the variable level factor $a$ is set to be a value in a relatively narrow range that includes 0.30.

The color difference signal (R-Y)'' obtained from subtractor 60 is further adjusted in level by a variable level adjuster 62 and then fed out at output terminal 64 as one of the two final color difference signals (R-Y). The color difference signal (B-Y)'' obtained from subtractor 61 is further adjusted in level by a variable level adjuster 63 and then fed out at output terminal 65 as the other final color difference signal (B-Y).

In the process of forming the color difference signal (R-Y), the difference output signal (B-G) obtained from subtractor 55 is adjusted in level by the variable level factor $a$ by variable level adjuster 57 so as to be used for producing the color difference signal (R-Y)'', and the color difference signal (R-Y)'' obtained from subtractor 60 is further adjusted in level by variable level adjuster 62. Thus, the color difference signal (R-Y) is obtained at output terminal 64 as a color difference signal that has been processed to correction unbalance in level among the red, green, and blue primary color signals (R, G, and B) based upon differences in spectral-response characteristics among image pickup unit elements for the red, green, and blue primary colors in the image pickup device.

Similarly, in the process of forming the color difference signal (B-Y), the subtraction output signal (R-G) obtained from subtractor 54 is adjusted in level to have the variable level factor $a$ by variable level adjuster 58 so as to produce the color difference signal (B-Y)'', and the color difference signal (B-Y)'' obtained from subtractor 61 is adjusted in level by variable level adjuster 63. Thus, the color difference signal (B-Y) is obtained at the output terminal 65 as a color difference signal that has been processed to correct the unbalance in level among the red, green, and blue primary color signals (R, G, and B) based upon differences in spectral-response characteristics among the image pickup elements for the red, green, and blue primary colors in the image pickup device.

Figure 1:
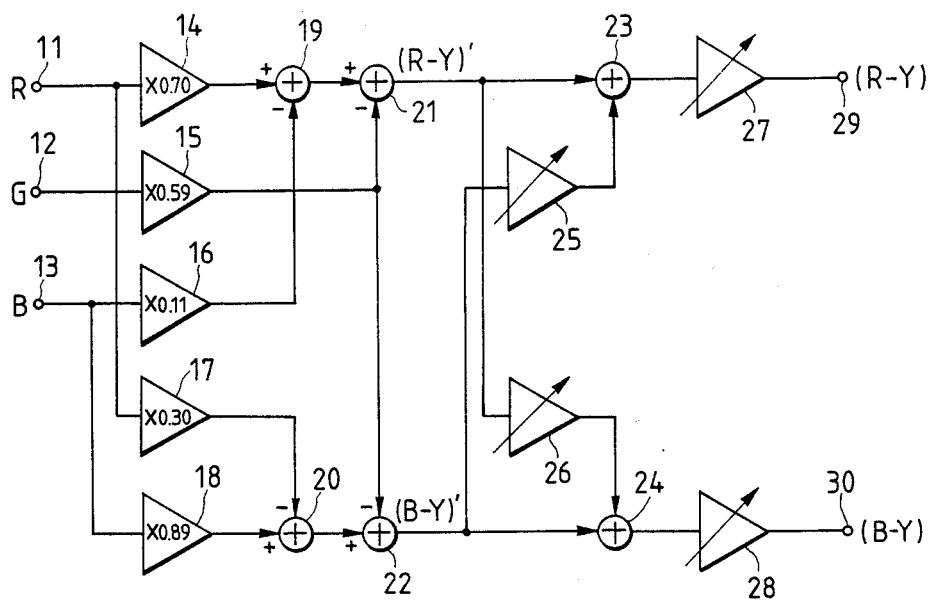
FIG. 1 is a schematic in block diagram form of a previously proposed color signal matrix circuit.
Figure 2:
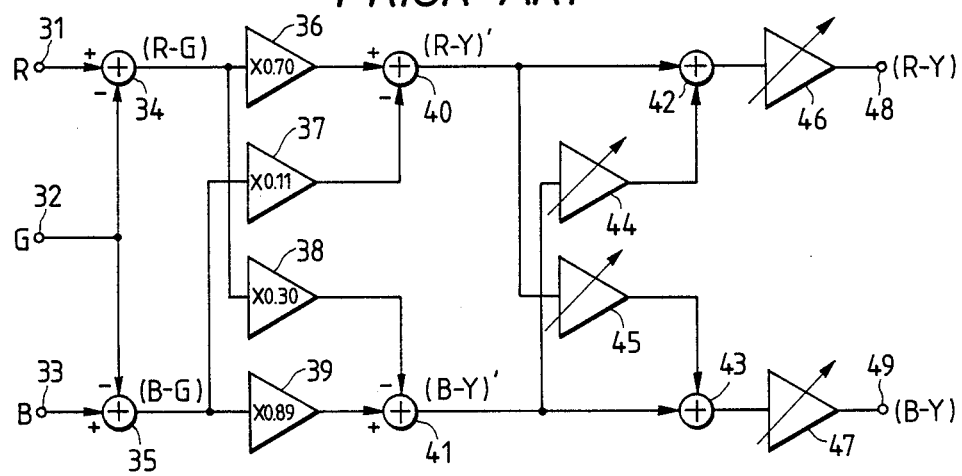
FIG. 2 is a schematic in block diagram form of another previously proposed color signal matrix circuit.

The embodiment shown in FIG. 3 and described in detail above requires the use of only four subtractors (54, 55, 60, and 61), which is a reduction in number compared with those used in the previously proposed color signal matrix circuit shown in FIGS. 1 or 2. Furthermore, the subtractors are constructed with a relatively simple configuration on a reduced scale. Also, only four level adjusters are required.

Figure 4:
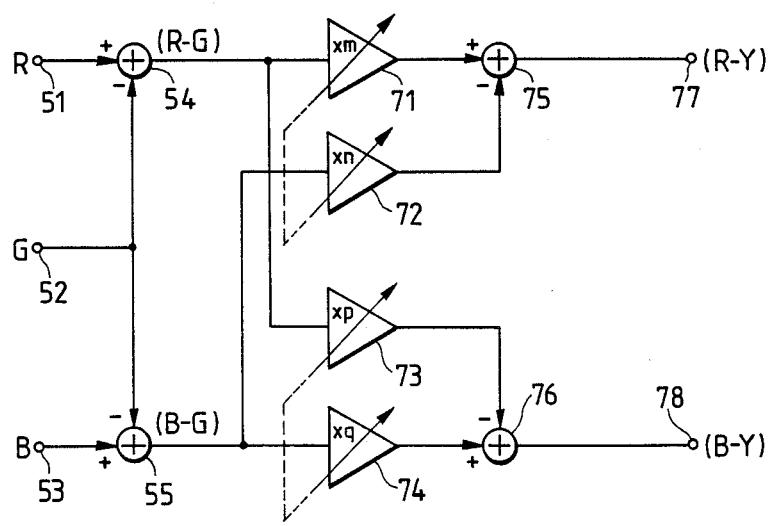
FIG. 4 is a schematic in block diagram form of another embodiment of a color signal matrix circuit according to the present invention.

FIG. 4 is another embodiment of a color signal matrix circuit according to the present invention that is also applied to a signal processing circuit used in a color video camera. In FIG. 4 circuit blocks and signals corresponding to those of FIG. 3 are marked with the same reference numerals.

In the embodiment of FIG. 4, three input terminals 51, 52, and 53 are provided as in FIG. 3, and red, green, and blue primary color signals (R, G, and B) in digital form are supplied to input terminals 51, 52, and 53, respectively. Then, the red primary color signal R from the input terminals 51 and the green primary color signal G from the input terminal 52 are supplied to subtractor 54 and the difference output signal (R-G) is obtained. The blue primary color signal B from input terminal 53 and the green primary color signal G from the input terminal 52 are supplied to subtractor 55 and a difference output signal (B-G) is obtained.

The subtraction output signal (R-G) obtained from subtractor 54 is adjusted in level by a variable level adjuster 71 provided with a variable level factor m set, for example, to a value in a relatively narrow range that includes 0.70, so as to have the level factor m of the (R-G) signal supplied to one input terminal of a subtractor 75. The (R-G) signal is also adjusted in level by a variable level adjuster 73 provided with a variable level factor p set, for example, to a value in a relatively narrow range that includes 0.30, so as to have the level factor p of the (R-G) signal supplied to one input terminal of a subtractor 76. Further, the difference output signal (B-G) obtained from subtractor 55 is adjusted in level by a variable level adjuster 74 provided with a variable level factor p set, for example, to a value in a relatively narrow range that includes 0.89, so as to have the level factor q of the (B-G) signal supplied to the other input terminal of subtractor 76. The (B-G) signal is also adjusted in level by a variable level adjuster 72 provided with a variable level factor n set, for example, to a value in a relatively narrow range that includes 0.11 so as to have the variable level factor n of the (B-G) signal supplied to the other input terminal of subtractor 75.

The narrow range of operation for the variable adjusters 71–74 is as explained above, so that adjuster 71 might be adjustable from 0.69 to 0.71 depending on tolerances of the components.

Upon making the adjustments to variable level adjusters, adjusters 72 and 73 are first adjusted for compensating color phase independent of level adjusters 71 and 74. Then, level adjusters 71 and 72 are ganged and simultaneously adjusted to compensate color saturation. Level adjusters 73 and 74 are ganged also. Thus, variable level adjusters 71 and 72 are ganged so as to be operative together for varying the respective variable level factors m and n to compensate color saturation, and variable level adjusters 73 and 74 are also ganged so as to work together for varying the respective variable level factors p and q to also compensate color saturation.

In subtractor 75, the subtraction output signal (B-G) adjusted in level by the variable level adjuster 72 is subtracted from the subtraction output signal (R-G), which has been adjusted in level by the variable level adjuster 71, to produce a color difference signal (R-Y) at an output terminal 77. In such an operation, assuming that an output of subtractor 75 is represented by [R-Y], the following equations are satisfied:

$$\begin{aligned}[R-Y] &= m(R-G) - n(B-G) \quad (3)\\ &= m(R-G) - n(B-G) + Y - Y\\ &= m(R-G) - n(B-G) + 0.30R +\\ &\quad 0.59G + 0.11B - Y\\ &= (R-y) + (m - 0.70)R +\\ &\quad (0.59 + n - m)G + (0.11 - n)B\end{aligned}$$

Because [R-Y] should be basically equal to (R-Y) in equation (3), the variable level factor m is set to a value in the relatively narrow range that includes 0.70 and the variable level factor n is set to a value in the relatively narrow range that includes 0.11.

Similarly, in subtractor 76, the difference output signal (R-G) adjusted in level by the variable level adjuster 73 is subtracted from the difference output signal (B-G) adjusted in level by the variable level adjuster 74 to produce a color difference signal (B-Y) at an output terminal 78. In such an operation, assuming an output of the subtractor 76 is represented by [B-Y], the following equations are also satisfied:

$$
\begin{aligned}
{[B-Y]} &= g(B-G) - p(R-G) \\
&= q(B-G) - p(R-G) + Y - Y \\
&= q(B-G) - p(R-G) + 0.30R + \\
&\quad 0.29G + 0.11B - Y \\
&= (B-Y) + (0.30-p)R + \\
&\quad (0.59+p-q)G + (q-0.89)B
\end{aligned}
\quad (4)
$$

Because [B-Y] should be basically equal to (B-Y) in equation (4), the variable level factor P is set to a value in the relatively narrow range that includes 0.30 and the variable level factor q is set to a value in the relatively narrow range that includes 0.89.

In the process of forming the color difference signal (R-Y) in the embodiment shown in FIG. 4, the difference output signal (R-G) obtained from the subtractor 54 is adjusted in level to the variable level factor m by variable level adjuster 71, so as to be used for producing the color difference signal (R-Y), and the subtraction output signal (B-G) obtained from the subtractor 55 is also adjusted in level to the variable level factor n by variable level adjuster 72, so as to be used for producing the color difference signal (R-Y). This results in the color difference signal (R-Y) being obtained at output terminal 77 as a color difference signal that has been processed to correct imbalance in level among the red, green, and blue primary color signals (R, G, and B) that results from differences in spectral-response characteristics among the image pickup unit elements for red, green, and blue primary colors in the image pickup device. Similarly, in the process of forming the color difference signal (B-Y) in the embodiment shown in FIG. 4, the difference output signal (B-G) obtained from subtractor 55 is adjusted in level to the variable level factor q by variable level adjuster 74, so as to be used for producing the color difference signal (B-Y), and the difference output signal (R-G) obtained from subtractor 54 is also adjusted in level to the variable level factor P by variable level adjuster 73, so as to be used for producing the color difference signal (B-Y). This results in signal (B-Y) at output terminal 78 as a color difference signal that has been processed to correct imbalance in level among the red, green, and blue primary color signals (R, G, and B) resulting from differences in spectral-response characteristics among the image pickup unit elements for the red, green, and blue primary colors in the image pickup device.

The embodiment shown in FIG. 4 and described in detail requires only four subtractors (54, 55, 75, and 76), which is a reduced number compared with the number of subtractors used in the previously proposed color signal matrix circuit shown in FIGS. 1 or 2, each of which required six subtractors, therefore, is constructed with a relatively simple configuration on a reduced scale even when compared with the embodiment of FIG. 3.

The above description is given on a single preferred embodiment of the invention, but it will be apparent that many modifications and variations could be effected by one skilled in the art without departing from the spirit or scope of the novel concepts of the invention, which should be determined by the appended claims.

What is claimed is:

1. A color signal matrix circuit for producing color difference signals from red, green, and blue primary color signals, comprising:
   first signal subtracting means for producing a first subtraction output signal representing a difference between red and green primary color signals,
   second signal subtracting means for producing a second subtraction output signal representing a difference between blue and green primary color signals,
   first level adjusting means receiving the first subtraction output signal,
   second level adjusting means having a variable level factor and receiving the second subtraction output signal,
   third signal subtracting means receiving the first subtraction output signal adjusted in level by said first level adjusting means and the second subtraction output signal adjusted in level by said second level adjusting means for producing therefrom a first color difference signal,
   third level adjusting means receiving the second subtraction output signal,
   fourth level adjusting means having a variable level factor and receiving the first subtraction output signal, and
   fourth signal subtracting means receiving the second subtraction output signal adjusted in level by said third level adjusting means and the first subtraction output signal adjusted in level by said fourth level adjusting means for producing a second color difference signal.

2. A color signal matrix circuit according to claim 1, wherein said third signal subtracting means is operative to subtract said second subtraction output signal adjusted in level by said second level adjusting means from said first subtraction output signal adjusted in level by said first level adjusting means and said fourth signal subtracting means is operative to subtract said first subtraction output signal adjusted in level by said fourth level adjusting means from said second subtraction output signal adjusted in level by said third level adjusting means.

3. A color signal matrix circuit according to claim 2, further comprising fifth level adjusting means provided with a variable level factor for adjusting a level of the first color difference signal and sixth level adjusting means provided with a variable level factor for adjusting a level of the second color difference signal.

4. A color signal matrix circuit according to claim 3, wherein said first level adjusting means is provided with a level factor set substantially at 0.70, said third level adjusting means is provided with a level factor set substantially at 0.89, the variable level factor of said second level adjusting means is set at a selected value in a relatively narrow range that includes 0.11, and the variable level factor of said fourth level adjusting means is set at a selected value in a relatively narrow range that includes 0.30.

5. A color signal matrix circuit according to claim 2, wherein said first and third level adjusting means comprise level adjusting means provided with variable level factors, respectively.

6. A color signal matrix circuit according to claim 5, wherein said first and second level adjusting means are operative to work together to vary their respective variable level factors, and said third and fourth level adjusting means are operative to work together to vary their respective variable level factors.

7. A color signal matrix circuit according to claim 6, wherein the variable level factor of said first level adjusting means is set at a selected value in a relatively narrow range that includes 0.70, the variable level factor of said second level adjusting means is set at a selected value in a relatively narrow range that includes 0.11, the variable level factor of said third level adjusting means is set at a selected value in a relatively narrow range that includes 0.89, and the variable level factor of said fourth level adjusting means is set at a selected value in a relatively narrow range that includes 0.30.

* * * * *

UNITED STATES PATENT AND TRADEMARK OFFICE
CERTIFICATE OF CORRECTION

PATENT NO. : 4,891,689

DATED : Jan. 2, 1990

INVENTOR(S) : Tetsuya Senda, et al.

It is certified that error appears in the above-identified patent and that said Letters Patent is hereby corrected as shown below:

Col. 1, line 17, change "Aluminance" to -- A luminance--

Col. 7, line 24, change "factor a" to --factor B--

Col. 8, line 22, change "factor p" to --factor $\underline{q}$-- line 63, change "(R-y)" to --(R-Y)--

Col. 9, line 14, change "= g" to --= $\underline{q}$-- line 17, change "0.29" to --0.59--

Signed and Sealed this

Fifth Day of February, 1991

Attest:

HARRY F. MANBECK, JR.

*Attesting Officer*      *Commissioner of Patents and Trademarks*